United States Patent [19]

Hashimoto et al.

[11] Patent Number: 4,567,573
[45] Date of Patent: Jan. 28, 1986

[54] ELECTRONIC LANGUAGE INTERPRETER WITH FACULTIES FOR MEMORIZING AND ERASING NEW WORDS EXTERNALLY APPLIED THERETO

[75] Inventors: Shintaro Hashimoto, Ikoma; Akira Tanimoto, Kashihara, both of Japan

[73] Assignee: Sharp Kabushiki Kaisha, Osaka, Japan

[21] Appl. No.: 472,269

[22] Filed: Mar. 4, 1983

Related U.S. Application Data

[63] Continuation of Ser. No. 110,689, Jan. 9, 1980, abandoned.

[30] Foreign Application Priority Data

Jan. 10, 1979 [JP] Japan ................................. 54-1824

[51] Int. Cl.⁴ ............................................ G06F 15/38
[52] U.S. Cl. ..................................... 364/900; 364/419
[58] Field of Search ... 364/200 MS File, 900 MS File, 364/705, 706, 709, 419; 381/51

[56] References Cited

U.S. PATENT DOCUMENTS

| | | | |
|---|---|---|---|
| 3,859,635 | 1/1975 | Watson | 364/200 |
| 3,970,996 | 7/1976 | Yasaka | 364/900 |
| 3,999,050 | 12/1976 | Pitroda | 364/900 |
| 4,117,542 | 9/1978 | Klausner | 364/900 |
| 4,158,236 | 6/1979 | Levy | 364/900 |
| 4,218,760 | 8/1980 | Levy | 364/900 |
| 4,279,022 | 7/1981 | Abe | 364/900 |
| 4,366,551 | 12/1982 | Holtz | 364/900 |
| 4,460,973 | 7/1984 | Tanimoto et al. | 364/900 |
| 4,464,731 | 8/1984 | Nishimura | 364/900 |
| 4,467,446 | 8/1984 | Sakurai | 364/900 |
| 4,475,171 | 10/1984 | Kanou | 364/900 |
| 4,502,128 | 2/1985 | Okajima et al. | 364/900 |
| 4,509,137 | 4/1985 | Yoshida | 364/900 |

FOREIGN PATENT DOCUMENTS 2029055  3/1980  United Kingdom ............... 364/705

Primary Examiner—James D. Thomas
Assistant Examiner—A. E. Williams, Jr.
Attorney, Agent, or Firm—Birch, Stewart, Kolasch & Birch

[57] ABSTRACT

An electronic dictionary and language interpreter includes an input keyboard actuated for entering a pair of a new word or words and a translated word or words corresponding thereto, a read/write memory for memorizing the pair of the word or words and the translated word or words, a read-only memory fixedly containing a plurality of pairs of a word/words and a translated word/words, and an access circuit operated for addressing the read/write memory and the read-only memory to cause retrieval of any desired pair of a word and a translation word or words among the new word or words and the translated word or words, and the plurality of pairs of the word/words and the translated word/words. Preferably, there is further provided a word cancellation circuit useful in permitting the removal of the pair of the new word or words and the translated word or words from the read/write memory. A different new pair of a new word or words and a translated word or words may replace the old pair of the word or words and the translated word or words in the read/write memory when the old pair has been applied from the input keyboard to the read/write memory.

12 Claims, 3 Drawing Figures

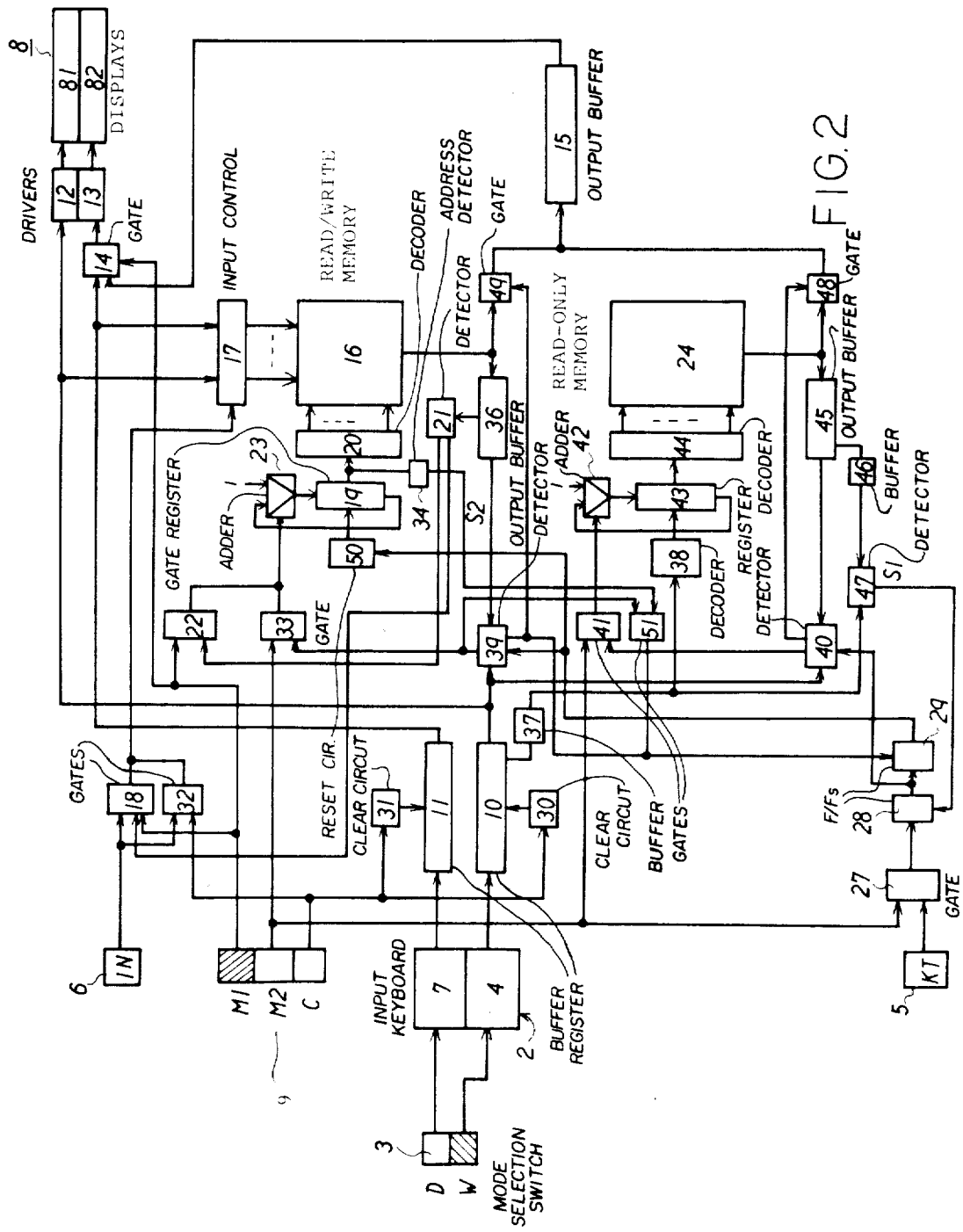

ELECTRONIC LANGUAGE INTERPRETER WITH FACULTIES FOR MEMORIZING AND ERASING NEW WORDS EXTERNALLY APPLIED THERETO

This application is a continuation of copending application Ser. No. 110,689, filed on Jan. 9, 1980, now abandoned.

BACKGROUND OF THE INVENTION

The present invention relates in general to a word information storage and retrieval apparatus and, more particularly, to an electronic dictionary and language interpreter with faculties for writing and erasing new words in addition to many words inherently stored therein.

Recently, a new type of electronic device called an electronic dictionary and language interpreter has been available on the market. The electronic dictionary and language interpreter differs from conventional types of electronic devices in that the former is of a unique structure which provides for efficient and rapid retrieval of word information stored in a memory. An example of such an electronic dictionary and language interpreter was disclosed in Levy, U.S. Pat. No. 4,158,236, June 12, 1979, "ELECTRONIC DICTIONARY AND LANGUAGE INTERPRETER".

As disclosed in U.S. Pat. No. 4,158,236, a plug-in read-only memory (ROM) may be indeed an effective means for increasing the capacity of words of the electronic dictionary and language interpreter as far as the plug-in read-only memory (ROM) is selectively and removably connected to a main part of the device.

However, this leads to the necessity of a great number of the plug-in ROMs in order to make a great number of the words available.

SUMMARY OF THE INVENTION

Accordingly, it is the primary object of the present invention to provide an improved electronic dictionary and language interpreter with the faculties of memorizing desired new words externally applied thereto.

It is a further object of the present invention to provide an improved electronic dictionary and language interpreter comprising means for freely memorizing and canceling desired words.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic dictionary and language interpreter comprises an input keyboard actuated for entering a pair of a new word words and its equivalent or translated word or words corresponding thereto, a read/write memory for memorizing the pair of the word or words and the translated word or words, a read-only memory fixedly containing a plurality of pairs of a word/words and a translated word/words, and an access circuit operated for addressing the read/write memory and the read-only memory to cause retrieval of any desired pair of a word and a translation word or words among the new word or words and the translated word or words, and the plurality of pairs of the word/words and the word/ words.

Preferably, there is further provided a word cancellation circuit useful for permitting the read/write memory to remove the pair of the new word or words and the translated word or words therefrom. A different new pair of a new word or words and a translated word or words may replace the old pair of the word or words and the translated word or words in the read/write memory although the old pair has also been applied from the input keyboard to the read/write memory.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 2 is a block diagram of a control circuit incorporated into the electronic dictionary and language interpreter shown in FIGS. 1(A) and 1(B).

DESCRIPTION OF THE INVENTION

First of all, any kind of languages may be used with the electronic dictionary and language interpreter of the present invention. An input "source" word or words are spelled in a specific language to obtain an equivalent word corresponding thereto or words, or a translated word spelled in a different language corresponding thereto. The languages may be freely selected. According to an example of the present invention, it is assumed that the specific language is English and the different language is Japanese.

Figure 1A:
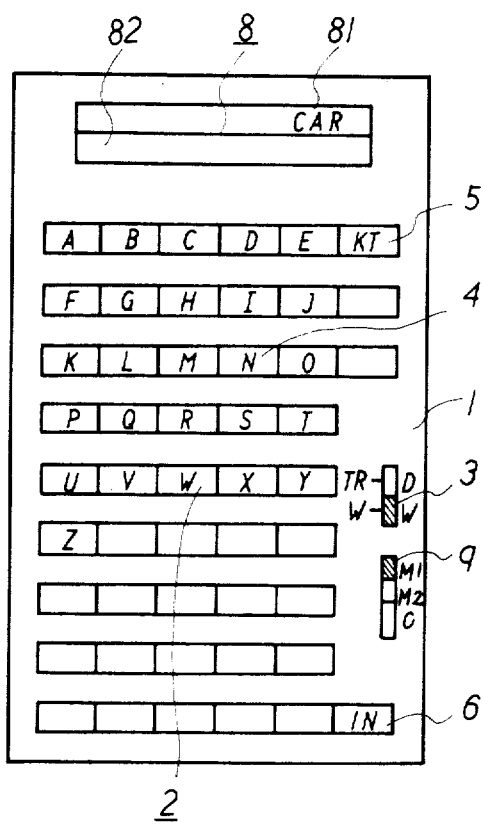
FIGS. 1(A) and 1(B) are each a plan view of an electronic dictionary and language interpreter according to the present invention, in particular, FIG. 1(A) being directed to a "source" word memory mode and FIG. 1(B) being concerned with a "translation" word memory mode of the electronic dictionary and language interpreter.
Figure 1B:
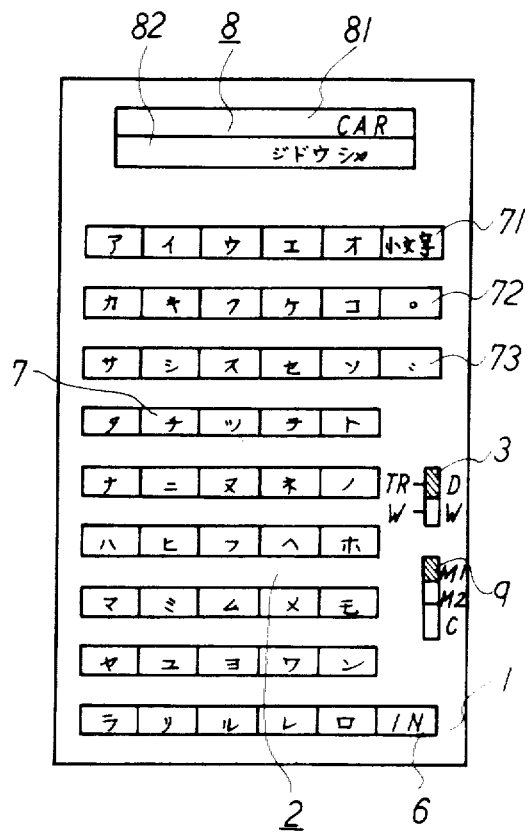

Referring to FIGS. 1(A) and 1(B), there is illustrated in a plan view an electronic dictionary and language interpreter with the present invention. In particular, FIG. 1(A) is concerned with a source word or words memory mode and FIG. 1(B) represents a translation word or words memory mode, both modes being provided by the same electronic dictionary and language interpreter.

In FIGS. 1(A) and 1(B), commonly the electronic dictionary and language interpreter comprises a main frame 1, an input keyboard 2, a mode selection switch 3, a mode changer 9, an indicator 8 containing a source word or words display 81 and a translation word or words display 82.

The mode selection switch 3 is actuated to select either of the source word or words memory mode shown in FIG. 1(A) and the translation word or words memory mode indicated in FIG. 1 (B). The source word or words memory mode is selected by setting the mode selection switch 3 in the position labeled as "W" as shown in FIG. 1(A). The translation word or words memory mode is obtained by placing the same switch 3 in the other position labeled as "D" as indicated in FIG. 1(B).

In synchronization with the selection of the mode selection switch 3, the function specified by each of a plurality of keys contained within the input keyboard 2 is altered. In the source word or words memory mode shown in FIG. 1(A), each key symbol labeled on the top of the plurality of keys within the input keyboard 2 is set to be that of alphabetical key switches 4, a translation instruction key switch 5, and a source/translation word or words setting key 6.

The alphabetical key switches 4 are actuated to enter desired source word or words as described below. The translation instruction key switch 5 and the source/translation word or words setting key 6 are also explained below.

In the translation word or words memory mode represented in FIG. 1(B), on the other hand, each key symbol printed on the top of the plurality of keys within the input keyboard 2 is changed to be that of Japanese "katakana" character key switches 7, the source/translation word or words setting key 6, a small letter key 71, a semivoiced sound key 72, and a voiced sound key 73. The Japanese "katakana" character key switches 7 are actuated to enter desired translation word or words corresponding to the entered source word or words as stated below. The small letter key 71 represented in Japanese "kanji" characters is actuated immediately after one of the Japanese "katakana" character key switches 7 which is required to be represented in a small written letter. Similarly, the semivoiced sound key 72 and the voiced sound key 73 are selectively actuated to change a desired Japanese "katakana" character entered to a character altered into semivoiced sound or voiced sound representation, respectively.

The above explained switching system of the label of the input key board 2 according to the selection of the mode selection switch 3 was disclosed in M. KOIKE et al U.S. patent application Ser. No. 26,568, filed April 3, 1979, entitled "THIN KEYBOARD WITH CHANGEABLE KEY INDICIA" assigned to the present assignee or other conventional keyboards.

The indicator 8 is structured as a two-storied device, more particularly, the source word or words display 81 for showing a source word or words, and the translation word or words display 82 for indicating a translation word or words. The mode changer 9 is actuated to set the electronic dictionary and langauge interpreter in either a memory mode $M_1$, a translation mode $M_2$, and memory word cancellation mode C. The memory mode $M_1$ enables the memory of the source word or words, otherwise, the memory of the translation word or words, The translation mode $M_2$ enables the retrieval and indication of a specified translation word or words corresponding to an English source word or words entered by the alphabetical key switches 4. The memory word cancellation mode C allows the cancellation of any word or words stored within the memory.

The control of the mode selection switch 3, the source word or words memory mode "W", or the translation word or words memory mode "D", is significant only in connection with the memory mode $M_1$ selected in the mode changer 9. In the other translation mode $M_2$ and memory word cancellation mode C by the mode changer 9, the control of the mode selection switch 3 has no instructive meaning.

FIG. 2 is a block diagram of a control circuit implemented within the electronic dictionary and language interpreter shown in FIGS. 1(A) and 1(B).

The input keyboard 2 acts as the alphabetical key switches 4 or the Japanese "katakana" character key switches 7 according to the selection of the mode selection switch 3. For convenience of description, the key switches 4 and 7 are represented as separate circuit elements in the control circuit shown in FIG. 2. Like elements corresponding to that of FIGS. 1(A) and 1(B) are indicated by like numerals.

First, the circuit elements of the control circuit concerned with the memory mode M1 will be described.

The control circuit mainly comprises a source word buffer register 10, a translation word buffer register 11, two drivers 12 and 13, a plurality of gate circuits 14, 18, 22, 27 and 32, an output buffer register 15, a read/write memory 16, an input control circuit 17, an address register 19, an address decoder 20, a detection circuit 21, an adder 23, a read only memory (ROM) 24, two D-type flip flop 28 and 29, and two clear circuits 30 and 31.

The source word buffer register 10 is a circuit element for storing alphabetical code information obtained by the actuation of one or more alphabetical key switches 4 in the order of actuated key switches. The source word buffer register 11 also contains Japanese "katakana" code information generated by the actuation of one or more Japanese "katakana" charactor key switches 7 in the sequence of actuated key switches.

The first driver 12 is operated to develop signals useful in indicating input source word or words in responce to output signals from the source word buffer register 10. The signals developed from the first driver 12 are applied to the source word or words display 81 so that the display 81 indicates the source word or words entered. The second driver 13 is operated to generate signals available for indicating an input translation word or words in resonse to output signals from the gate circuit 14. The signals from the second driver 13 are applied to the translation word or words display 82 so that the display 82 shows the translation word or words entered.

The gate circuit 14 is controlled according to the selection of the mode changer 9. The gate circuit 14 functions to transfer output signals from the translation word buffer register 11 into the second driver 13 under the conditions where the mode changer 9 is placed in the memory mode M1. On the other hand, the gage circuit 14 acts to transmit output signals from the output buffer register 15 into the second driver 13 under the conditions where the mode changer 9 is set in the translation mode M2.

The read/write memory 16 is provided for memorizing words externally applied. According to a preferred embodiment of the present invention, code information stored in the source word buffer register 10 representing a source word or words and code information stored in the translation word buffer register 11 designating a translation word or words are both stored as they are. The read/write memory 16 is comprised of a non-volatile memory which maintains the stored information even in the absence of power supply of the electronic dictionary and language interpreter or a volatile memory of the type wherein the stored information can be reformed according to the presence of the power supply of the device, say, a semiconductor random access memory (RAM).

The input control circuit 17 comprised of gate means is provided for allowing the read/write memory 16 to memorize the source word or words information stored in the source word buffer register 10 and the translation word or words information contained within the translation word buffer register 11. The input control circuit 17 is energized in response to output signals from the source/translation word or words setting key 6, the output signals of the key 6 being supplied through the gate circuit 18. The gate circuit 18 is turned conductive under the conditions that the mode changer 9 is placed in the memory mode M1.

The input control circuit 17 is operated to transfer the source word or words information from the source word buffer register 10 and the translation word or words information from the translation word buffer register 11 into the read/write memory 16 in response to output signals from the gate circuits 18 and 32.

The input control circuit 17 is operated so that the source word or words information and the translatidn word or words information are stored in one or more predetermined addresses of the read/write memory 16.

Further attention is directed to a group of circuit elements of the control circuit which enable the memory of both the source word or words information stored in the source word buffer register 10 and the translation word or words information contained in the translation word buffer register 11 into one or more appropriate addresses of the read/write memory 16.

For this particular purpose, the control circuit shown in FIG. 2 further comprises a plurality of gate circuits 33, 41, 48, 49, and 51, a final address detection circuit 34, two output buffer circuits 36 and 45, leading character input buffer circuits 37 and 46, a decoder 38, coincidence detection circuits 39 and 40, an adder 42, an address register 43, an address decoder 44, a leading character coincidence detection circuit 47, and a reset circuit 50.

(1) Memory Mode M1:

The address register 19 is a register for addressing the read/write memory 16. The address decoder 20 is a decoder for the read/write memory 16. The detection circuit 21 is provided to determine whether output information developed from the read/write memory 16 is equivalent to the source word or words information, or the translation word or words information and, otherwise, no output information is generated by the memory 16 thus representing that word information is not generated from the memory 16. The detection circuit 21 develops output signals applied to the gate circuit 22 under the condition that word information is developed from the read/write memory 16. The output information from the read/write memory 16 is applied to the output buffer circuit 36 and then to the detection circuit 21.

The gate circuit 22 is placed in a conductive state when mode changer 9 is in the memory mode M1. The gate circuit 22 is responsive to the output signals from the detection circuit 21 to pass through the output signals from the circuit 21 toward the adder 23, in which case the adder 23 increases the number of the address by one to be specified in the address register 19.

The count-up operation performed for the address register 19 is repeated under the state of the memory mode M1 unless the zero information representing the absence of word information stored in the address of the read/write memory 16 is developed from the memory 16. If zero information is detected by the detection circuit 21, the detection circuit 21 provides output signals admitted into the gate circuit 18. In such a case, the input control circuit 17 is operated in response to the actuation of the source/translation word or words setting key 6. Thus the source word or words information from the source word buffer register 10 and the translation word or words information from the translation word buffer register 11 are both introduced into the address of the read/write memory 16, the address being now specified by means of the address register 19.

(2) Translation Mode M2:

The ROM 24 is a storing for fixedly memorying a plurality of pairs of the English source word or words and the Japanese translation word or words in the alphabetical sequence of the English source word or words. In the translation mode M2 defined by the actuation of the mode changer 9, one or more alphabetical key switches 4 are actuated to enter desired English source word or words into the source word buffer register 10. The English source word or words entered are indicated in the source word or words display 81.

The leading character of the source word or words entered is transferred into the leading character input buffer circuit 37. Code information representative of the leading character received by the buffer circuit 37 is decoded by the decoder 38. The number of a leading address specifying the entered source word or words is introduced into the address register 43, the entered source word or words starting at the leading character. Hence the address register 43 causes access of code information stored in the ROM 24 with the help of the address decoder 44. The code information representing a pair of an English word or words and a translation thereof developed from the ROM 24 is applied to the output buffer circuit 45. The coincidence detection circuit 40 is coupled to the source word buffer register 10 and the output buffer circuit 45. The coincidence detection circuit 40 determines the equivalence between the contents of the source word buffer register 10 and the code information from the ROM 24 to the output buffer circuit 45 in connection with the English word or words.

When the translation instruction key switch 5 is actuated to begin the performance of the retrieval and the indication of the translation Japanese word or words equivalent to the English source word or word entered, output signals from the translation instruction key switch 5 are applied to the gate circuit 27 which is placed in conductive status by the translation mode M2. The D-type flip flop 28 is turned set in response to output signals from the gate circuit 27. Hence the D-type flip flop 28 generates its output signals entered into the coincidence detection circuit 40 so that the detection circuit 40 begins its coincidence detection operation for the contents of the source word buffer register 10 and the code information from the output buffer circuit 45 representing the English word or words.

Under the circumstances that the coincidence detection is not obtained, the coincidence detection circuit 40 generates a signal indicating the discrepancy to the gate circuit 41. The gate circuit 41 energizes the adder 42 so that the address defined by the address register 43 is increased by one with the help of the adder 42. Therefore a pair of the following English and Japanese word or words are developed from the ROM 24 to the output buffer circuit 45. The coincidence detection circuit 40 is also energized to conduct the coincidence detection operation again.

The coincidence detection circuit 40 is repeatedly operated only under the conditions where the leading character coincidence detection circuit 47 determines the coincidence between the leading character contained in the leading character input buffer circuit 46 and that of the same 37. The leading character input buffer circuit 46 receives the leading character of the developed English word stored in the output buffer circuit 45.

The coincidence detection circuit 40 and the leading character coincidence detection circuit 47 are circuit elements for discovering any English word or words memorized in the ROM 24 equivalent to any desired English word or words externally applied. As far as this particular function is accomplished, any other circuit elements could be available to replace the coincidence detection circuit 40 and the leading conincidence detection circuit 47.

When the coincidence detection circuit 40 determines the equivalence, it generates output signals applied to the gate circuit 48 representing the occurrence of the equivalence. The output buffer circuit 45 is responsive to the gate circuit 48 so that the developed Japanese word or words contained within the output buffer circuit 45 are transferred into the output buffer register 15.

In the translation mode M2, the gate circuit 14 is responsive to the output buffer register 15 for allowing the specified Japanese word or words to be indicated in the translation word or words display 82 with the aid of the second driver 13.

If and when the leading character coincidence detection circuit 47 can not find out any word among the various English word developed from the ROM 24, the word being equivalent to the English source word or words entered in the leading character, the detection circuit 47 generates its output signals S1 applied to the D-type flip flop 28 for reset purposes. Hence the second D-type flip flop 29 coupled to the D-type flip flop 28 is turned set. Output signals from the second D-type flip flop 29 are applied to the reset circiut 50 so that the reset circuit 50 causes the address register 19 to be reset.

In such a case, the leading address of the read/write memory 16 is specified with the address register 19. The output signals from the second D-type flip flop 29 are also admitted to the second coincidence detection circuit 39. The second coincidence detection circuit 39 is placed in operation states so that it determines the coincidence between the contents stored in the source word buffer register 10 and the English word or words contained within the output buffer circuit 36. The English word or words within the output buffer circuit 36 are obtained from the read/write memory 16 through access by the address register 19.

As far as the second coincidence detection circuit 39 does not determine the coincidence therebetween, it generates output signals to the gate circuit 33. The adder 23 is responsive to the gate circuit 33 for increasing the address of the contents in the address register 19 by one. In this manner, the read/write memory 16 is accessed as similar as the ROM 24 until the second conicidence detection circuit 39 detects the coincidence therebetween. When the coincidence is obtained by the detection circuit 39, it develops output signals applied to the gate circuit 49 and the gate circuit 29. In such a case, the gate circuit 49 enables the output buffer circuit 36 to develop the Japanese word or words into the output buffer register 15, the Japanese translation word or words being equivalent to the English source word or words which are now determined to be identified by means of the second coincidence detection circuit 39.

The Japanese translation word or words stored in the output buffer register 15 are indicated in the translation word or words display 82 through the use of the gate circuit 14 and the second driver 13. The gate circuit 19 is turned reset in response to the output signals from the second coincidence detection circuit 39, the output signals representing the operation of the equivalence between the English word or words which are stored in the read/write memory 16. Therefore, the retrieval operations are terminated.

If and when there is not present any word or words stored in the read/write memory 16 equivalent to the English word or words externally applied even though all the addresses of the memory 16 are completely accessed, the gate circuit 19 is also turned reset by means of the second coincidence detection circuit 39 and the final address detection circuit 34. The final address detection circuit 34 provides output signals S2 applied to the gate circuit 51 upon the determination of the final address for the read/write memory 16. The second coincidence detection circuit 39 also generates the output signals designating the inconsistency between the English word or words from the source word buffer register 10 and the English word or words from the output buffer circuit 36, the output signals being applied also to the gate circuit 51. The gate circuit 51 generates output signals to the second D-type flip flop 29 so that the flip flop 29 is turned reset. Therefore, the retrieval operations are terminated.

(3) Memorized Word Cancellation Mode C:

The word information contained within the source word buffer register 10 and the translation word buffer register 11 is canceled as follows: (1) the translation mode M2 is first selected by the mode changer 9, wherein an English source word or words required to be canceled from the read/write memory 16 are introduced into the source word buffer register 10 by means of the alphabetical key switches 4; (2) the translation instruction key switch 5 is secondly actuated so that one or more addresses of the read/write memory 16 are selected in which the English word or words required to be canceled are stored together with the Japanese translation word or words needed to be also canceled; (3) thereafter, the memorized word cancellation mode C is selected in the mode changer 9 wherein the clear circuits 30 and 31 are operated so as to allow the information stored in both the source word buffer register 10 and the translation word buffer register 11 to the canceled completely, respectively.

Although the translation word buffer register 11 will not contain any significant information because of lack of use of the Japanese "katakana" character key switches 7, the contents of it are canceled only by way of precaution by means of the clear circuit 31.

The (4) the source/translation word or words setting key 6 is then finally actuated so as to energize the input control circuit 17 through the use of the gate circuit 32 which is responsive to the selection of the memorized word cancellation mode C for being turned conductive. The input control circuit 17 is operated so that the null contents stored in both the source word buffer register 10 and the translation word buffer register 11 are memorized in the now selected one or more addresses of the read/write memory 16. As stated above, the now selected one or more addresses of the read/write memory 16 contain the English and Japanese translation word or words required to be canceled.

It will be apparent from the description of the memorized word cancellation mode C that an old pair of an English word or words and a Japanese translation word or words, the old pair being contained within the read/write memory 16, can be readily replaced by a new pair of an English word or words and a Japanese translation word or words, the new pair being applied by the keyboard actuation. For this purpose, the memory mode M1 is selected in the mode changer 9, in which case the two types of the keyboards 4 and 7 are both actuated to enter a desired new pair of an English word or words and a Japanese translation word or words after the cancellation of the old pair of the English word or words and the Japanese translation word or words executed with the memorized word cancellation mode C.

It is desired that the old pair of the English word or words and the Japanese translation word or words be directly replaced by a new pair of an English word or words and a Japanese translation word or words without the use of the memorized word cancellation mode C, it would be further necessary for a means to directly access one or more addresses of the read/write memory 16 in which the old pair of the English word or words and the Japanese translation word or words are memorized. Using such the means, the new pair of the English word or words and the Japanese translation word or words would replace the old pair of the English word or words and the Japanese translation word or words in the specified one or more addresses of the read/write memory 16.

As stated above, the fixed memory 24 is actually comprised of a semiconductor ROM and the read/write memory 16 is actually composed of a semiconductor RAM. The both ROM and RAM are incorporated into a large scale integrated (LSI) circuit chip. If the size of the RAM is enlarged, this leads to the enlargement of the size of the LSI chip. Therefore, it would be preferable in practice that a major number of word or words to be memorized be memorized in the ROM and a minor number of the word or words be memorized in the RAM. According, a considerably small number of the word or words should be selectively memorized in the RAM, preferably.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic dictionary and language interpreter comprising:
   read/write memory means for storing source word data and associated translation data, said source word data representing a source word in a first language and said translation data representing a translation word which is a translation of said source word in a second language;
   input means for introducing said source word data and translation data into said read/write memory means when said interpreter is in a storage mode;
   said input means further introducing data into said interpreter representative of a desired word in said first language to be translated when said interpreter is in a translation mode;
   said interpreter further having a word cancellation mode;
   means, operatively interconnected to said input means, for selecting between said storage mode, said word cancellation mode and said translation mode;
   read only memory means for containing a volume of source word data and associated translation data;
   search means for comparing said desired word data introduced by said input means with said source word data within said read only memory means and said read/write memory means and, upon detection of a coincidence therebetween, for recalling the translation data associated with said source word data from said read/write or said read only memory means;
   means responsive to said search means for outputting said translation data recalled by said search means to thereby provide a translation of said desired word; and
   means for selectively cancelling source word and translation data in a particular portion of said read/write memory means, said means for selectively cancelling being responsive to said mode selection means to select and cancel the source word and translation data corresponding to a desired word entered by said input means.

2. The interpreter of claim 1 wherein said input means includes a keyboard having a plurality of key switches.

3. The interpreter of claim 2 wherein said key switches of said keyboard selectively input alphanumeric data or Japanese katakana character data;
   the function of said key switches being varied to input alphanumeric data and katakana character data in dependence on whether source word or translation data is to be entered.

4. The interpreter of claim 3 wherein said first language is English and said second language is Japanese.

5. The interpreter of claim 3 wherein said read/write memory means is a Random Access Memory.

6. The interpreter of claim 5 wherein said means for outputting includes first and second displays, the first display displaying the source word while the second display displays the translation.

7. The interpreter of claim 3 wherein said input means further includes register means for temporarily storing the data introduced by said input means and control means for transferring said introduced data from said register means into said read/write memory means in response to selection of one of said modes selected by said means for selecting.

8. The interpreter of claim 3 wherein said search means includes first addressing circuit means for selecting locations in said read/write memory means.

9. The interpreter of claim 8 wherein said search means further includes second addressing circuit means for selecting locations in said read only memory means.

10. The interpreter of claim 9 wherein said search means further comprises search control means responsive to said search means for enabling said first addressing circuit means and upon failure of said search means to find a coincidence between said desired word data and said source word data, for enabling said second addressing circuit means.

11. The interpreter of claim 9 wherein said first addressing circuit means includes:
    address means for addressing said read/write memory means;
    output register means responsive to said read/write memory means for receiving output signals from said read/write memory means;
    determination means connected to the output register means for detecting the absence of word information generated by said read/write memory means and producing an output indicative thereof;

read/write control means responsive to the output of said determination means for controlling the access by said address means to said read/write memory means to enable said read/write memory means to memorize data corresponding to a new word entered by said input means in one or more addresses of said read/write memory means.

12. The interpreter of claim 9, wherein said second addressing circuit means includes:

address means provided for addressing said read-only memory means;

output register means responsive to said read-only memory means for receiving word information from said read-only memory means;

comparison means coupled to said output register means and said input means for successively determining the correspondence between the word information obtained from said read-only memory means and a retrieval word entered by said input means;

ROM control means responsive to said comparison means for controlling the access by said address means to said read-only memory means;

said ROM control means being further operated to provide control signals applied to said first addressing circuit so as to allow said first addressing circuit to address said read/write memory means to thereby generate word information from said read/write memory means.

* * * * *